United States Patent [19]

Urasaki et al.

[11] 3,917,731
[45] Nov. 4, 1975

[54] PROCESS FOR PRODUCING DIALKYLTETRALINS

[75] Inventors: Takanori Urasaki; Isao Oka; Makoto Ogasawara; Takeo Shima, all of Iwakuni, Japan

[73] Assignee: Teijin Limited, Osaka, Japan

[22] Filed: Aug. 9, 1974

[21] Appl. No.: 495,763

[52] U.S. Cl. .................. 260/668 F; 260/666 PY
[51] Int. Cl. ............................................ C07c 15/24
[58] Field of Search ................................ 260/668 F

[56] References Cited
UNITED STATES PATENTS

| | | | |
|---|---|---|---|
| 2,272,266 | 2/1942 | Grosse | 260/668 F |
| 3,078,319 | 2/1963 | Wood | 260/668 F |
| 3,840,609 | 10/1974 | Oka et al. | 260/668 F |

Primary Examiner—Veronica O'Keefe
Attorney, Agent, or Firm—George L. Church; Donald R. Johnson; J. Edward Hess

[57] ABSTRACT

A process for preparing dialkyltetralins which comprises contacting an alkenylbenzene selected from compounds of the following formula

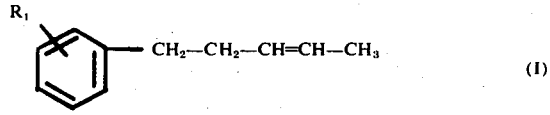

(I)

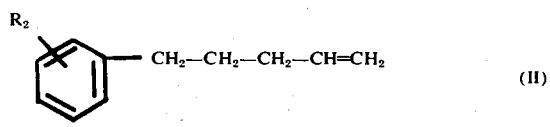

(II)

and

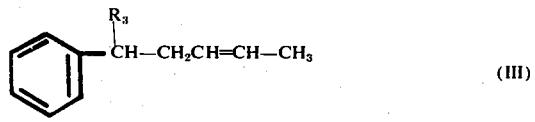

(III)

wherein $R_1$ and $R_2$ are a group selected from the class consisting of methyl, ethyl and isopropyl groups, $R_3$ is a methyl or ethyl group, and $R_1$, $R_2$ and $R_3$ are the same or different, with boron phosphate at a temperature of 100°C. to 400°C.

3 Claims, No Drawings

PROCESS FOR PRODUCING DIALKYLTETRALINS

This invention relates to a novel process for preparing dialkyltetralins from alkenylbenzenes in a superior conversion and a high selectivity while avoiding the formation of by-products. The process poses no corrosion problem of the equipment by the catalyst and can be performed advantageously in respect of handling and operation and also of the recovery and regeneration of the catalyst.

More specifically, the invention relates to a process for preparing dialkyltetralins, which comprises contacting an alkenylbenzene selected from the group consisting of compounds of the following formula (I), (II) and (III)

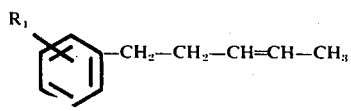

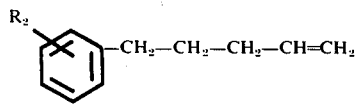

and

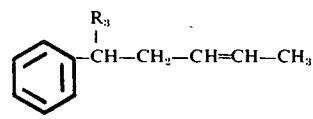

wherein $R_1$ and $R_2$ are a group selected from the class consisting of methyl, ethyl and isopropyl groups, $R_3$ is a methyl or ethyl group, and $R_1$, $R_2$ and $R_3$ are the same or different,
with boron phosphate at a temperature of 100°C. to 400°C.

Naphthalenedicarboxylic acids useful as a raw material for polyesters can be obtained by oxidizing dimethyl naphthalenes which are prepared by dehydrogenation of dimethyl tetralines.

A method has previously been known which comprises preparing 1,5-dimethyl tetralin using 5-(o-tolyl)-pentene-(2) as a raw material and boron trifluoride or hydrogen fluoride as a catalyst. This conventional method requires the use of a great quantity of the catalyst, and the catalyst has a strongly corrosive nature. Accordingly, it has the defect that it suffers from disadvantages in operation and equipment, and the recovery of the catalyst is difficult.

Furthermore, German OLS No. 2,242,777 discloses a process for preparing alkyltetralins by contacting alkenylbenzenes with a solid phosphoric acid catalyst at a temperature of 180°C. to 350°C. to cyclize the alkenylbenzenes.

The use of the solid phosphoric acid catalyst, however, leads to the inclusion of a small amount (usually, about 1 to 5 ppm, for example) of phosphorus in the reaction product. When such a reaction product is dehydrogenated to produce a dialkylnaphthalene, the phosphorus adversely affects the dehydrogenation catalyst.

We investigated a process for obtaining dimethyl tetralins in good yields and high selectivity without the defects of the conventional techniques, and found that when at least one alkenylbenzene of the formula (I), (II) or (III) above is contacted with boron phosphate, it is cyclized to form a dialkyltetraline, that the conversion to the dialkyl tetralin and the selectivity are high with the reduced formation of by-products, and that the catalyst does not cause a corrosion problem and can be recovered easily.

Accordingly, it is an object of this invention to provide a novel process for preparing dialkyltetralins having the above advantages.

Many other objects and advantages of this invention will become more apparent from the following description.

Specific examples of the alkenyl benzenes expressed by the formula (I), (II) or (III) are shown below.

Examples of the compound of the formula (I) are o-methyl-(3-pentenyl) benzene, m-methyl-(3-pentenyl) benzene, m-methyl-(3-pentenyl) benzene, p-methyl-(3-pentenyl) benzene, o-ethyl-(3-pentenyl) benzene, m-ethyl-(3-pentenyl) benzene, p-ethyl-(3-pentenyl) benzene, o-isopropyl-(3-pentenyl) benzene, and p-isopropyl-(3-pentenyl) benzene. Examples of the compound of the formula (II) include o-methyl-(4-pentenyl) benzene, m-methyl-(4-pentenyl) benzene, p-methyl-(4-pentenyl) benzene, o-ethyl-(4-pentenyl) benzene, m-ethyl-(4-pentenyl) benzene, p-ethyl-(4-pentenyl) benzene, o-isopropyl-(4-pentenyl) benzene, m-isopropyl-(4-pentenyl) benzene, and p-isopropyl-(4-pentenyl) benzene. Examples of the compound of the formula (III) include (1-methyl-3-pentenyl) benzene and (1-ethyl-3-pentenyl) benzene. These compounds can be used either alone or in admixture of at least two.

According to the present invention, dialkyltetralins of the following formula (A)

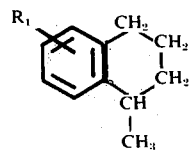

wherein $R_1$ is the same as in the general formula (I) above, can be obtained from the compounds of the formula (I).

From the compounds of the formula (II), there can be obtained dialkyltetralins of the formula (B)

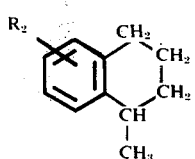

wherein $R_2$ is the same as in the general formula (II) above. Furthermore, dialkyltetralins of the following formula (C)

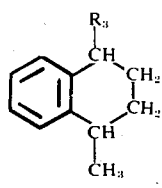

wherein $R_3$ is the same as in the general formula (III) above, can be obtained from the compounds of the formula (III).

When the compound of the formula (I) or (II) is used as $R_1$ or $R_2$ is at the o-position to the alkenyl group, 1,5-dialkyltetralins can be obtained. When it is at the m-position to the alkenyl group, 1,6-dialkyltetralins and 1,8-dialkyltetralins are obtained. Further, when it is at the p-position, 1,7-dialkyltetralins are obtained.

According to the process of this invention, boron phosphate is used as a cylization catalyst.

There is no particular restriction on the method for preparing the boron phosphate. One example is a method which involves mixing boric acid and ortho-phosphoric acid and reacting the mixture at a temperature of 60°C. to 100°C. When the ortho-phosphoric acid is used in a proportion of about 1 to about 1.5 mols per mol of the boric acid, there can be obtained boron phosphate having high catalytic activity. Another example is a method which involves mixing and heating boron oxide and phosphorus oxychloride, or a method which involves mixing and heating boron trichloride and phosphorus pentoxide. The resulting boron phosphate can be dried in vacuo at room temperature to 200°C. These methods are described, for example, in J. W. Mellor, A COMPREHENSIVE TREATISE ON INORGANIC AND THEORETICAL CHEMISTRY, Vol. 5.

The boron phosphate obtained can be used as it is, if it is dry. It is however preferred to calcine it at a temperature of up to 1000°C., especially about 200°C. to about 600°C., prior to use.

The form of the catalyst is not restricted in particular, but any desired form such as powder, granule or pellet can be employed.

The process of this invention can be carried out either in the gaseous phase or the liquid phase and either batchwise or continuously. Although the reaction can be carried out without using a diluent, an inert gas such as nitrogen, hydrogen or carbon dioxide or a hydrocarbon such as cyclohexane, n-hexane, benzene, toluene, xylene or naphthalene can be used as the diluent.

The reaction temperature is about 100° to about 400°C., preferably about 150° to about 350°C. If the reaction temperature is too high, the starting hydrocarbon tends to be isomerized or thermally decomposed to disadvantage.

The reaction can be performed either at normal atmospheric pressure, or at an elevated pressure.

The catalyst may be used either as a fixed bed catalyst or as a fluidized bed catalyst. The amount of the catalyst is not particularly restricted, but when a powdery catalyst is dispersed in a liquid starting material, it is preferred that the catalyst is used in an amount of 1 to 100% by weight, especially 2 to 30% by weight, based on the starting alkenylbenzene. When the reaction is performed in a fixed bed-type reactor while feeding the starting material continuously, it is preferred that the starting alkenylbenzene is fed at a rate of 0.05 to 5 parts by weight, especially 0.1 to 1 part by weight, per hour per part by weight of the catalyst.

Since boron phosphate is used as a cyclization reaction catalyst in the process of this invention, the conversion of the material to the dialkyltetralin and the selectivity are high, and the amounts of by-products formed for example by dimerization or trimerization of the starting material are reduced. Furthermore, boron phosphate is a solid catalyst and forms a heterogeneous reaction system. Accordingly, the handling of the catalyst, its separation and recovery from the reaction product, and its regeneration are easy, and the corrosive nature of the catalyst is reduced.

Furthermore, in the process of this invention, side-reactions are inhibited and dialkyltetralins can be produced at high selectivity as compared with the case of using other solid acid catalysts, such as silica-alumina or silica-magnesia.

Unlike the case of using the solid phosphoric acid catalyst, there is no likelihood of a small amount of phosphorus being included in the reaction product, and accordingly, even when the resulting alkyltetralin is further dehydrogenated, there is no adverse effect on the dehydrogenation catalyst.

The following Examples illustrate the present invention in greater detail. In the Examples, all parts and percentages are by weight. SV referred to in these Examples expresses the amount (grams) fed of the material fed per hour per gram of the catalyst.

EXAMPLE 1

Boric acid and ortho-phosphoric acid were mixed in a molar ratio of 1 : 1.2, and reacted for 5 hours with stirring. The reaction product was dried in vacuo at room temperature for 24 hours. Boron phosphate obtained was pulverized to 12 to 24 mesh (Tyler's mesh) by a mortar, and calcined for 5 hours at 400°C. in a stream of nitrogen.

50 g of the calcined boron phosphate was packed into a glass tube having an inside diameter of 23 mm and a length of 400 mm, and heated and maintained at 240°C. This tube was used as a reaction tube, and gasified o-methyl-(3-pentenyl) benzene was fed into the reaction tube from its bottom in varying amounts together with 0.5 l/min. of heated dry nitrogen gas. The reaction product was withdrawn from the top of the reaction tube, condensed and collected. The product was analyzed by gas-chromatography, and the results are shown in Table 1.

Table 1

| | Run No. | 1 | 2 | 3 |
|---|---|---|---|---|
| | SV (g/hr.g.cat.) | 0.20 | 0.40 | 0.80 |
| | Material (unchanged) | 0% | 0% | 1% |
| Composition of product | Material with the side chain isomerized | 6% | 6% | 6% |
| | Dimethyl tetralin | 94% | 94% | 92% |
| | Polymerized high boiling substances | 0% | 0% | 1% |

It can be seen from the above results that an overwhelmingly great amount of the dimethyl tetralin was formed, and the formation of byproducts was reduced.

COMPARATIVE EXAMPLE 1

Example 1 was repeated except that the cyclization reaction temperature was changed to 450°C., and the reaction was performed at a space velocity of 0.44 g/hr.g.cat. The composition of the reaction product was as follows:

| | |
|---|---|
| Material (unchanged) | 7% |
| Material with the side chain isomerized | 15% |
| Dimethyl tetralin (1,5- and 1,6-isomers) | 77% |
| Polymerized high boiling substances | 1% |

Comparison of the results of Comparative Example 1 with those of Example 1 shows that when the reaction temperature is too high, the yield of the dimethyl tetralin is reduced, and side reactions such as the isomerization of the side chain tend to occur.

EXAMPLE 2

The same boron phosphate (5 g) as used in Example 1 was placed in a flask equipped with a condenser and a stirring rod, and 100 g of o-methyl-(3-pentenyl) benzene was reacted at 220°C. in the flask. The heating time was changed as shown in Table 2, and the product obtained at the end of each of the specified heating periods was analyzed by gas-chromatography. The results are shown in Table 2.

Table 2

| | Run No. | 1 | 2 | 3 |
|---|---|---|---|---|
| | Heating time (hours) | 1 | 3 | 5 |
| Composition of the product | Material (unchanged) | 1% | 1% | 0% |
| | Material with the side chain isomerized | 3% | 3% | 3% |
| | Dimethyl tetralin | 92% | 92% | 93% |
| | Polymerized high boiling substances | 4% | 4% | 4% |

EXAMPLE 3

Example 2 was repeated except that the reaction temperature was changed to 150°C. to cyclize o-methyl-(3-pentenyl) benzene. The results are shown in Table 3.

Table 3

| | Run No. | 1 | 2 | 3 |
|---|---|---|---|---|
| | Heating time (hours) | 1 | 3 | 5 |
| Composition of the product | Material (unchanged) | 78% | 43% | 11% |
| | Material with the side chain isomerized | 0% | 0% | 1% |
| | Dimethyl tetralin | 19% | 54% | 84% |
| | Polymerized high boiling substances | 3% | 3% | 4% |

It can be seen from the above results that even at a reaction temperature lower than 220°C., the amounts of by-products are small, and dimethyl tetralin is obtained at a high selectivity.

EXAMPLE 4

Example 1 was repeated except that the molar ratio of boric acid to ortho-phosphoric acid was adjusted to 1 : 1 in the catalyst preparation step, to cyclize o-methyl-(3-pentenyl) benzene. The results obtained are shown in Table 4.

Table 4

| | Run No. | 1 | 2 | 3 |
|---|---|---|---|---|
| | SV (g/hr.g.cat.) | 0.22 | 0.44 | 0.79 |
| Composition of the product | Material (unchanged) | 0% | 1% | 5% |
| | Material with the side chain isomerized | 5% | 6% | 7% |
| | Dimethyl tetralin | 94% | 92% | 87% |
| | Polymerized high boiling substances | 1% | 1% | 1% |

EXAMPLE 5

Example 1 was repeated except that o-isopropyl-(3-pentenyl) benzene was used as the starting material. The results obtained are shown in Table 5.

Table 5

| | Run No. | 1 | 2 |
|---|---|---|---|
| | SV (g/hr.g.cat.) | 0.21 | 0.54 |
| Composition of the product | Material (unchanged) | 0% | 0% |
| | Material with the side chain isomerized | 7% | 7% |
| | Methylisopropyl tetralin | 93% | 92% |
| | Polymerized high boiling substances | 0% | 1% |

EXAMPLE 6

Example 1 was repeated except that m-methyl-(3-pentenyl) benzene was used as the material. The results obtained are shown in Table 6.

Table 6

| | Run No. | 1 | 2 |
|---|---|---|---|
| | SV (g/hr.g.cat.) | 0.20 | 0.49 |
| Composition of the product | Material (unchanged) | 0% | 0% |
| | Material with the side chain isomerized | 6% | 6% |
| | Dimethyl tetralin | 94% | 93% |
| | Polymerized high boiling substances | 0% | 1% |

EXAMPLE 7

Example 2 was repeated except that uncalcined boron phosphate was used as the catalyst. The results obtained are shown in Table 7.

Table 7

| | Run No. | 1 | 2 |
|---|---|---|---|
| | Heating time (hours) | 1 | 3 |
| Composition of the product | Material (unchanged) | 9% | 0% |
| | Material with the side chain isomerized | 6% | 6% |
| | Dimethyl tetralin | 80% | 84% |
| | Polymerized high boiling substances | 5% | 10% |

EXAMPLE 8

Example 1 was repeated that p-(methyl-3-pentenyl)-benzene was used as the material. The results obtained are shown in Table 8.

Table 8

| | Run No. | 1 | 2 |
|---|---|---|---|
| | SV (g/hr.g.cat.) | 0.20 | 0.51 |
| Composition of the | Material (unchanged) | 0% | 0% |
| | Material with the side chain isomerized | 6% | 7% |

Table 8-continued

|  | Run No. | 1 | 2 |
|---|---|---|---|
|  | SV (g/hr.g.cat.) | 0.20 | 0.51 |
| product | Dimethyl tetralin | 94% | 92% |
|  | Polymerized high boiling substances | 0% | 1% |

EXAMPLE 9

Example 1 was repeated except that 1-methyl-3-pentenyl-benzene was used as the material. The results obtained are shown in Table 9.

Table 9

|  | Run No. | 1 | 2 |
|---|---|---|---|
|  | SV (g/hr.g.cat.) | 0.20 | 0.53 |
| Composition of the product | Material (unchanged) | 0% | 0% |
|  | Material with the side chain isomerized | 6% | 6% |
|  | Dimethyl tetralin | 94% | 93% |
|  | Polymerized high boiling substances | 0% | 1% |

What we claim is:

1. A process for preparing dialkyltetralins which comprises contacting an alkenylbenzene selected from compounds of the following formula

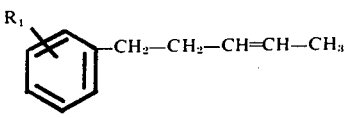   (I)

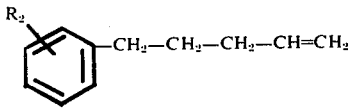   (II)

and

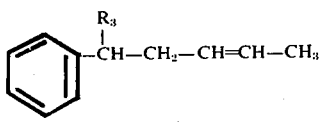   (III)

wherein $R_1$ and $R_2$ are a group selected from the class consisting of methyl, ethyl and isopropyl groups, $R_3$ is a methyl or ethyl group, and $R_1$, $R_2$ and $R_3$ are the same or different, with boron phosphate at a temperature of 100°C. to 400°C.

2. The process of claim 1 wherein said alkenylbenzene is contacted with boron phosphate at a temperature of 150°C. to 350°C.

3. The process of claim 1 wherein boron phosphate calcined at 200°C. to 600°C. is used as the catalyst.

* * * * *